Patented Apr. 28, 1936

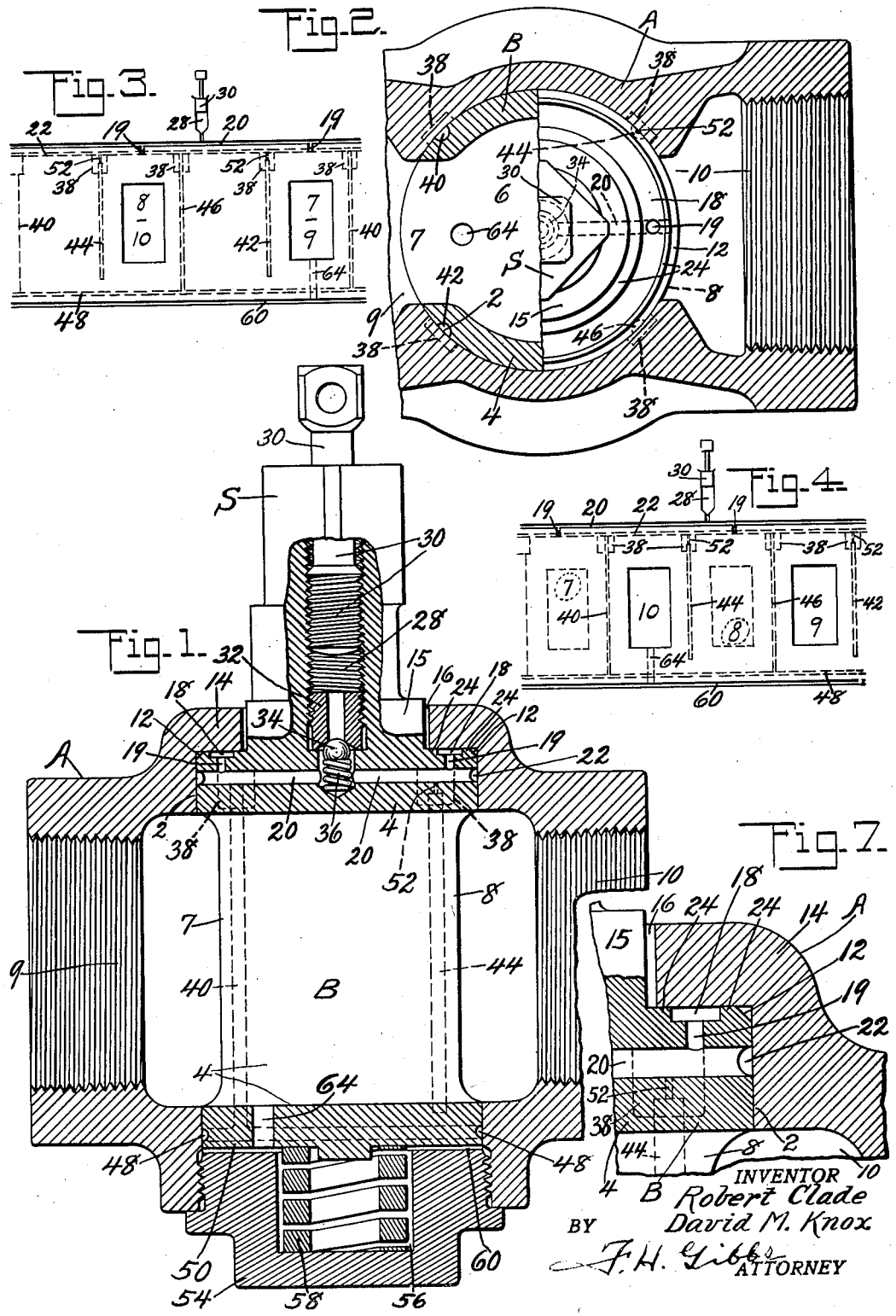

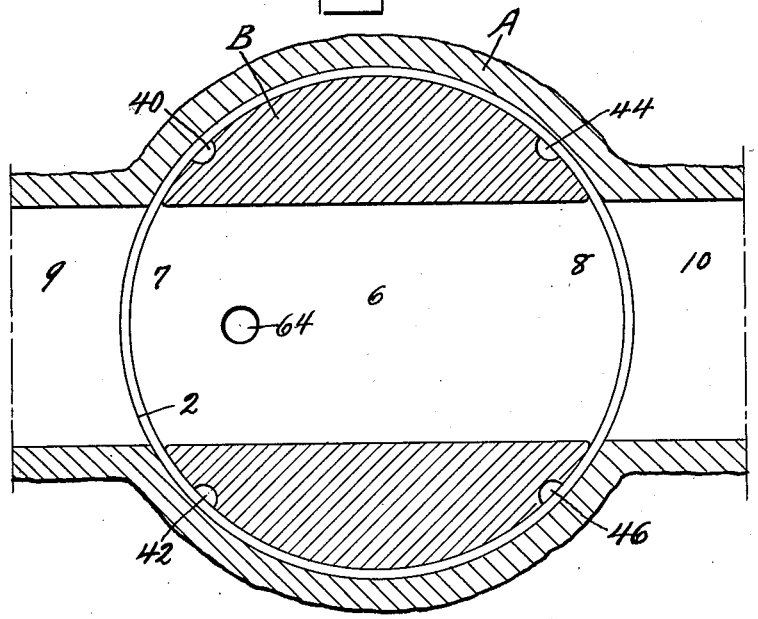
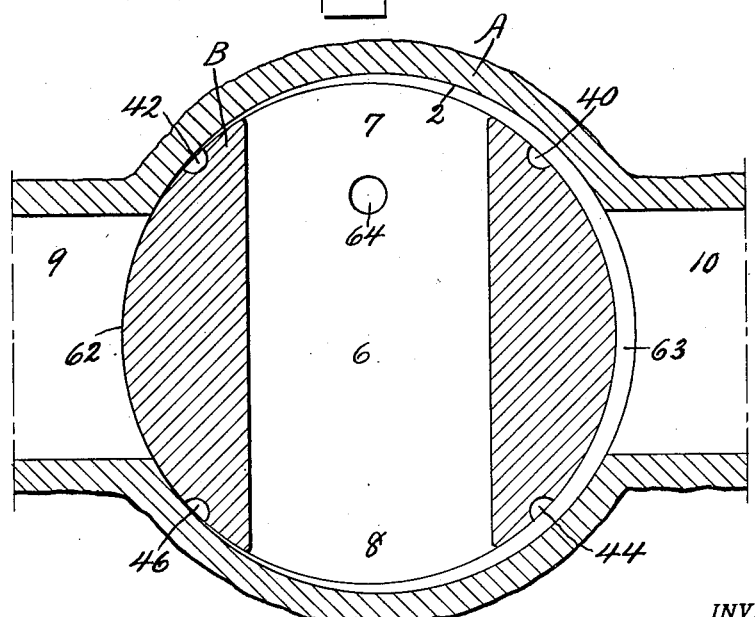

2,038,887

UNITED STATES PATENT OFFICE 2,038,887

LUBRICATED VALVE

Robert Clade, Detroit, Mich., and David M. Knox, New York, N. Y., assignors to American Car and Foundry Company, New York, N. Y., a corporation of New Jersey Application March 15, 1933, Serial No. 660,841

24 Claims. (Cl. 251—93)

This invention relates generally to lubricated valves of the type in which lubricant under pressure is forced between the contacting surfaces of a valve plug and a valve body to seal the valve against leakage.

One object of the present invention is the provision of a new and improved type of two-way lubricated valve.

Another object of this invention is the provision of a lubricated valve including a body and a plug which is rotatably movable and axially shiftable within said body.

Still another object of this invention is the provision of a lubricated valve comprising a valve body having a plug rotatably mounted therein, the plug being axially shiftable within the body under certain conditions to prevent the building up of excess pressure within the valve body.

A further object of this invention is the provision of a new and improved valve plug for lubricated valves.

A still further object of this invention is the provision of a valve of the lubricated type in which, when the plug shifts radially within the body under the influence of line pressure exerted thereagainst, means are provided for permitting the escape of liquid which is trapped within the plug whereby the possibility of the development of bursting pressure within the plug is eliminated.

This invention also contemplates the provision of a new and improved lubricant groove arrangement for lubricated valves.

A still further object of this invention is the provision of a lubricated valve of the two-way type which is easy and inexpensive to manufacture and strong and durable in operation.

Other objects and advantages of this invention will be apparent from the following description taken in conjunction with the accompanying drawings in which:

Figure 1 is a sectional view through the valve of the present invention showing the valve in open position.

Fig. 2 is a view partly in plan and partly in section of the valve shown in Fig. 1.

Fig. 3 is a diagrammatic view of the lubricant groove arrangement when the valve of the present invention is in open position.

Fig. 4 is a diagrammatic view of the lubricant groove arrangement of the valve of the present invention when said valve is in closed position.

Fig. 5 is a sectional view, substantially diagrammatic, showing the relative positions of the valve body and valve plug when said valve is in open position.

Fig. 6 is a substantially diagrammatic sectional view of the valve of the present invention showing the relative positions of the valve body and valve plug when the valve is in closed position, and Fig. 7 is an enlarged sectional view showing details of construction of the valve plug and valve body at the head portion of the valve.

Referring now more particularly to the drawings in which similar characters of reference designate similar parts in the several views, the valve is of the two-way type and comprises a body indicated generally at A having a longitudinal bore providing a substantially cylindrical plug seat 2 for a cylindrical plug indicated generally at B. The plug is rotatably fitted to the seat 2 and comprises a body portion 4 having a transverse bore 6 therethrough providing plug ports 7 and 8 which are adapted to be alined with body ports 9 and 10 respectively to permit flow through the valve.

The upper marginal edge of the body portion 4 of the plug is beveled as at 12 (see Fig. 7) and the upper end portion of said plug is machined to engage the lower surface of the head portion 14 of the valve body, said head portion being provided with an opening through which the stem S of the plug B projects. In the instance shown the head portion 14 of body A is formed integral with the body and its lower surface is machined whereby the upper end portion of the plug sealingly engages said head portion in metal-to-metal contact. Obviously the head portion may be formed as an independent element attached to the body in any suitable or desired manner. The stem S is so formed as to receive a suitable tool for rotating the plug and the lower portion 15 thereof is spaced from the head portion of the body to provide a lubricant escape passage 16, the purpose of which will be more clearly described hereinafter.

Defined between overlapping portions of the plug and head portion 14 is a lubricant chamber 18. In the instance shown in the drawings, the chamber 18 is formed by an annular recess in the upper end portion of the plug, but this is merely by way of example as obviously the recess may, if desired, be formed in the head portion 14. This chamber 18 is adapted to receive lubricant under pressure through vertical ducts 19 formed in the plug at the lubricant chamber and extending to a lubricant channel 20 formed in the upper portion of the plug and extending transversely therethrough into communication with an upper circumferential lubricant groove 22 formed in the outer or seating surface of the body portion 4 of the plug.

Due to the lubricant chamber 18 it is apparent that a pair of relatively wide spaced bearing portions 24 are provided at the upper end portion of the plug which are substantially concentrically arranged and engage the lower surface of the head of the valve body in metal-to-metal contact to seal the valve against leakage at the head portion.

The stem S is hollow and constitutes a lubricant reservoir 28 within which a ram 30 is movable to force lubricant through a valve seat member 32 secured in the lower end portion of the reservoir past a ball check valve 34 normally held in engagement with said seat member by a spring 36 seated in the plug at the transverse lubricant channel 20.

Formed in the body A are dwarf grooves 38 arranged one each adjacent each side of the body ports but above said ports as shown in Fig. 1 and so positioned as to constantly communicate with the upper circumferential groove 22 to receive lubricant therefrom. The dwarf grooves 38 extend longitudinally of the body and are of a length sufficient to overlap the upper end portions of lubricant grooves formed longitudinally in the seating surfaces of the plug when the valve is in either closed or open position. The plug grooves are arranged respectively along opposite sides of the transverse bore 6 of the plug; in other words, along opposite sides of the plug ports 7 and 8 and are indicated in the drawings, particularly Figs. 3 and 6, as 40, 42, 44 and 46 respectively, grooves 40 and 42 extending longitudinally of the plug along opposite sides of plug port 7 while grooves 44 and 46 extend longitudinally along opposite sides of the plug port 8. The grooves 40 and 46 are of such length as to communicate with the circumferential groove 22 at their upper ends (see Figs. 1, 2 and 3) and with a lower circumferential lubricant groove 48 formed in the lower portion or bottom 50 of the plug whereby lubricant may be directly and freely conducted from the upper lubricant groove 22 to the lower lubricant groove 48, hence from the upper portion of the valve to the lower portion thereof regardless of the position of the plug B in the body A. The longitudinal grooves 42 and 44 in the plug terminate at their lower ends above the lower circumferential groove 48 and their upper end portions are reduced in diameter as by scratch grooves 52 which extend into communication with the upper circumferential groove 22 and provide for constant but restricted passage of lubricant under pressure from groove 22 to said plug grooves 42 and 44.

The lower end portion of the valve body is closed by a base plate 54 having a recess 56 therein providing a seat for a compression spring 58 which engages the bottom wall 50 of the plug B and normally serves to retain the upper end portion of the plug, more particularly the surfaces 24 thereof in metal-to-metal sealing contact with the head portion 14 of the valve body and providing a space 60 between the base plate and plug.

Fig. 1 shows the valve in open position wherein the bore of the plug is alined with body ports 9 and 10 for fluid flow through the valve. With the valve in this position the plug is substantially centrally arranged within the body as shown more or less diagrammatically in Fig. 5. Fig. 3 shows the lubricant groove arrangement when the valve is in open position and it can be seen that when lubricant is forced by the ram 30 from the reservoir 28 into the transverse channel 20 it will pass through the vertical ducts 19 into the lubricant chamber 18 and also to the upper circumferential groove 22. The lubricant, being under pressure in the groove 22 and the dwarf grooves 38 being in direct connection with the plug grooves 40, 42, 44 and 46, will pass from the circumferential groove 22 through the plug grooves and the lubricant from grooves 40 and 46 will pass directly to the lower circumferential groove 48. From these plug grooves it will be apparent that a film of grease will flow around the plug and between the seating surface thereof and the seat 2 of the body.

If the plug B be partially rotated to restrict flow through the valve, the lubricant under pressure from the circumferential groove 22 is still permitted to pass into the plug grooves due to the connection thereof with said groove 22. Lubricant will flow unrestrictedly and freely from the groove 22 into the plug grooves 40 and 46 and lubricant will flow into the plug grooves 42 and 44 through the scratch grooves 52 which, while restricting the passage of lubricant into the plug grooves 42 and 44, do not prevent the passage of lubricant. With the valve in closed position the lubricant grooves assume the relative positions shown in Fig. 4 and it is apparent that the dwarf grooves 38 are in communication with the several plug grooves for the passage of lubricant from the circumferential groove 22 down the sides of the plug. With the valve in closed position it is apparent that, due to line pressure exerted against the plug, the latter will shift radially in the body and thus be substantially eccentrically positioned therein as shown diagrammatically in Fig. 6. The portion of the plug B opposite that subjected to line pressure is retained in substantially metal-to-metal sealing contact with the body as indicated at 62, therefore leakage from the valve is positively prevented at the egress port. This radial shifting of the plug B causes the clearance between the plug and body to be increased at the portion of the plug subjected to line pressure. This increased clearance is at a maximum at the ingress port of the valve body (indicated in the drawing at 63), the clearance diminishing circumferentially of the plug toward the opposite portion thereof. With the plug in this shifted position lubricant under pressure can pass from between the plug and body into the interior of the plug as the clearance between the plug and body adjacent the plug ports 7 and 8 is sufficient to permit such passage. It is apparent that as the plug is turned from open to closed position fluid is trapped within the plug at a pressure substantially equal to the line pressure in the event that no means for venting said fluid is provided. The lubricant which passes into the interior of the plug as mentioned just above is at a pressure considerably in excess of the line pressure and, in the absence of any means for relieving the interior of the plug of pressure, it will be apparent that the pressure developed within the plug by the fluid trapped therein and the lubricant which leaks thereinto may be sufficient to burst the plug. The present invention provides a means for eliminating the possibility of the development of bursting pressures within the plug and to that end the bottom 50 of the plug is provided with a leak duct or port 64 which leads to the space

60 below the plug. In use, when the plug is in closed position, as indicated in Fig. 6, the plug B is maintained in metal-to-metal sealing engagement with the head portion 14 by means of line pressure which obviously can pass below the plug and act against the bottom 50 thereof, in addition to the spring 58. Should the line pressure drop below that sufficient to maintain the plug and head portion in sealing engagement, the spring 58 is effective to maintain such engagement.

It is apparent that when the plug is rotated to close the valve liquid is trapped therewithin. As before mentioned, under the influence of line pressure the plug will shift radially within the body and this permits the passage of lubricant under pressure into the interior of the plug and such lubricant, while it may be of small amount, may be and often times is sufficient to raise the pressure of the trapped liquid to a point which might burst the plug. In other words, in the absence of any means for relieving internal pressure from within the plug the lubricant in conjunction with the trapped liquid may develop a pressure sufficient to burst the plug. The provision of the leak port 64 eliminates this possibility and the development of bursting pressures within the plug is prevented by the leakage of liquid from the plug through said port 64 and into the intake port 10.

From the above description it can be seen that the valve of the present invention is so designed as to prevent the development of bursting pressures within the plug or within any portion of the valve. Operation of the ram 30 causes the lubricant to flow between the plug and body under pressure. Due to the fact that grease or lubricants in general are semi-solid they do not conform to the law of the transmission of pressures of liquids and therefore when lubricant is forced into the valve body by the ram the pressure is greatest at the head portion of the valve. It will be obvious that when the pressure at said head portion exceeds the combined action of the spring 58 and the line pressure against the bottom 50 of the plug B the latter will shift axially within the body to cause a separation of the plug and head portion and permit the escape of lubricant from the body through the escape opening 16 surrounding the stem S. This furnishes a visual signal indicating that the valve is properly and sufficiently lubricated. When the pressure within the valve body is reduced below that of the action of the spring 58 and the line pressure, the plug will shift axially within the body to again cause the metal-to-metal engagement of the surfaces 24 with the head portion 14.

From the description it is believed that the construction and operation of the valve of the present invention will be apparent to those skilled in the art. The drawings herein illustrate one embodiment of the invention but it is to be understood that they are for illustrative purposes only and various changes in the form and proportion of the construction may be made within the scope of the appended claims without departing from the spirit of the invention.

What is claimed is:

1. A valve comprising a body having a transverse passageway therethrough, an internal plug seat and a head portion, a plug rotatably mounted in the seat and having its upper end portion in sealing engagement with the head portion, said plug having a transverse bore therethrough adapted to be alined with the passageway, a lubricant chamber in the upper end portion of the plug covered by the head portion, circumferential lubricant seals between the plug and body respectively above and below the passageway, longitudinal grooves formed in the plug each having communication at their upper ends with the upper lubricant seal, some thereof having their lower ends terminating at but communicating with the lower lubricant seal and the remainder having their lower ends terminating short of said lubricant seal, and means including a ram for forcing lubricant under pressure to said lubricant chamber, lubricant seals and plug grooves.

2. In a valve, a body having a transverse passageway and an internal seat, a head portion for the body, a plug rotatably engaging the seat and provided with a transverse bore adapted to be alined with said passageway, a lubricant chamber formed in the upper end portion of the plug and defined by overlapping portions of said plug and head portion, circumferential grooves in the plug adjacent the upper and lower end portions thereof adapted to hold lubricant to provide annular lubricant seals between the body and plug above and below the passageway, longitudinal grooves formed in the plug along opposite sides of the bore and connected at their upper ends with the upper circumferential groove whereby to be supplied with lubricant therefrom at all times regardless of the position of the plug in the body, some of said longitudinal grooves being in direct communication with the lower circumferential groove, means for forcing lubricant under pressure to said grooves and lubricant chamber and a spring supporting the plug in engagement with the head portion and adapted to yield upon axial movement of the plug in the body in response to pressure against the upper end portion of the plug in excess of the action of said spring to cause separation of the plug and head portion whereby to permit escape of excess lubricant from the body.

3. In a valve, a body having a transverse passageway and an internal seat, a head portion for the body, a plug rotatably engaging the seat and provided with a transverse bore adapted to be alined with said passageway, a lubricant chamber formed in the upper end portion of the plug and defined by overlapping portions of said plug and head portion, circumferential grooves in the plug adjacent the upper and lower end portions thereof adapted to hold lubricant to provide annular lubricant seals between the body and plug above and below the passageway, longitudinal grooves formed in the plug along opposite sides of the bore and connected at their upper ends with the upper circumferential groove whereby to be supplied with lubricant therefrom at all times regardless of the position of the plug in the body, some of said longitudinal grooves being in direct communication with the lower circumferential groove and the remainder of said longitudinal grooves being free of connection with the lower circumferential groove whereby the latter is cut off from communication with said last named longitudinal grooves, means for forcing lubricant under pressure to said grooves and lubricant chamber and a spring supporting the plug in engagement with the head portion and adapted to yield upon axial movement of the plug in the body in response to pressure against the upper end portion of the plug in excess of the force exerted by said spring to permit the separation of the plug and head portion and the escape of excess lubricant from the body.

4. A valve comprising a body having a transverse passageway and an internal seat, a head portion for the body, a plug rotatable on said seat and having its upper end portion in sealing engagement with the head portion, a lubricant chamber in the upper end portion of the plug covered by the head portion, circumferential grooves in the seating surface of the plug adjacent its upper and lower ends respectively, said plug having a transverse bore therethrough adapted to be alined with the passageway, longitudinally arranged lubricant grooves formed in the plug, alternate grooves extending between and being in unrestricted communication with the upper and lower circumferential grooves while the remainder of the grooves are in constant but restricted communication with the upper circumferential groove, a lubricant channel formed transversely in the plug and communicating at its ends with the upper circumferential grooves, ducts leading from the channel to the lubricant chamber, a spring retaining the upper end portion of the plug in engagement with the head portion, and means for forcing lubricant under pressure through the channel to said grooves and lubricant chamber.

5. A valve comprising a body having a transverse passageway and an internal seat, a head portion for the body, a plug rotatable on said seat and having its upper end portion in sealing engagement with the head portion, a lubricant chamber in the upper end portion of the plug covered by the head portion, circumferential grooves in the seating surface of the plug adjacent its upper and lower ends respectively, said plug having a transverse bore therethrough adapted to be alined with the passageway, longitudinally arranged lubricant grooves formed in the plug, alternate grooves extending between and being in unrestricted communication with the upper and lower circumferential grooves while the remainder of the grooves are in constant but restricted communication with the upper circumferential groove, a lubricant channel formed transversely in the plug and communicating at its ends with the upper circumferential grooves, ducts leading from the channel to the lubricant chamber, a spring retaining the upper end portion of the plug in engagement with the head portion, means for forcing lubricant under pressure through the channel to said grooves and lubricant chamber, and a leak port from the interior of the plug to permit escape of trapped liquid from within the plug to the passageway when the plug is in closed position.

6. In a valve, a body having a transverse passageway and an internal cylindrical seat, a head portion for the body, a cylindrical plug rotatably fitting the seat and provided with a transverse bore therethrough, a spring normally retaining the upper end portion of the plug in sealing engagement with the head portion, a lubricant recess in the upper end portion of the plug covered by the head portion, circumferential grooves in the plug adjacent the upper and lower end portions thereof, longitudinal grooves in the plug in constant communication at all times with the upper circumferential groove, the lower ends of certain of said grooves terminating short of the lower circumferential groove and the remainder of said grooves extending into communication with the lower circumferential groove, and means for forcing lubricant into said lubricant recess and grooves regardless of the position of the plug within the body, said grooves being so arranged as to provide a circuit of lubricant along each side of and above and below the passageway in the body when the plug is in either closed or open position.

7. A valve comprising a body having a transverse passageway therethrough and an internal cylindrical seat, a head portion for the body, a cylindrical plug rotatably mounted in the seat and having its upper end portion in metal-to-metal sealing engagement with the head portion, a lubricant chamber formed in the upper end portion of the plug covered by the head portion, circumferential lubricant grooves in the seating surface of the plug adjacent its upper and lower ends, longitudinal lubricant grooves formed in the plug, certain of said longitudinal grooves having unrestricted communication at all times with the upper and lower circumferential grooves and the remainder of the longitudinal grooves being free of communication with the lower circumferential groove and having constant but restricted communication with the upper circumferential groove, a transverse lubricant channel in the plug communicating with the upper circumferential groove, ducts connecting the channel and lubricant chamber, and means including a ram for forcing lubricant under pressure to said channel and the beforementioned grooves and lubricant chamber.

8. A valve comprising a body having a transverse passageway therethrough and an internal cylindrical seat, a head portion for the body, a cylindrical plug rotatably mounted in the seat and having its upper end portion in metal-to-metal sealing engagement with the head portion, a lubricant chamber formed in the upper end portion of the plug covered by the head portion, circumferential lubricant grooves in the seating surface of the plug adjacent its upper and lower ends, longitudinal lubricant grooves formed in the plug, certain of said longitudinal grooves having unrestricted communication at all times with the upper and lower circumferential grooves and the remainder of the longitudinal grooves being free of communication with the lower circumferential groove and having constant but restricted communication with the upper circumferential groove, a transverse lubricant channel in the plug communicating with the upper circumferential groove, ducts connecting the channel and lubricant chamber, dwarf grooves formed in the body and communicating with the upper circumferential groove, said dwarf grooves being so arranged as to be overlapped by the longitudinal plug grooves when the plug is in either closed or open position, a spring normally retaining the upper end portion of the plug in engagement with the head portion, said spring being adapted to yield upon axial movement of the plug in the body in response to pressure against the upper end portion of the plug in excess of the spring action whereby to permit escape of lubricant from the valve body, and means for forcing lubricant under pressure to said channel and the beforementioned grooves and lubricant chamber.

9. A valve comprising a body having a transverse passageway therethrough and an internal cylindrical seat, a head portion for the body, a cylindrical plug rotatably mounted in the seat and having its upper end portion in metal-to-metal sealing engagement with the head portion, a lubricant chamber formed in the upper end portion of the plug covered by the head portion, circumferential lubricant grooves in the seating surface of the plug adjacent its upper and lower ends, longitudinal lubricant grooves formed in the plug, certain of said longitudinal grooves having unrestricted communication at all times with the upper and lower circumferential grooves and the remainder of the longitudinal grooves being free of communication with the lower circumferential groove and having constant but restricted communication with the upper circumferential groove, a transverse lubricant channel in the plug communicating with the upper circumferential groove, ducts connecting the channel and lubricant chamber, dwarf grooves formed in the body and communicating with the upper circumferential groove, said dwarf grooves being so arranged as to be overlapped by the longitudinal plug grooves when the plug is in either closed or open position, a spring normally retaining the upper end portion of the plug in engagement with the head portion, said spring being adapted to yield upon axial movement of the plug in the body in response to pressure against the upper end portion of the plug in excess of the spring action whereby to permit escape of lubricant from the valve body, means for forcing lubricant under pressure to said channel and the beforementioned grooves and lubricant chamber, and a leak port formed in the bottom of the plug and extending from the interior thereof to permit escape of trapped liquid from the interior of the plug.

10. In a lubricated valve, a plug comprising a body portion provided with a stem, a circular recess formed in the upper end portion of the plug, circumferential grooves formed adjacent the upper and lower ends of the plug, a lubricant channel extending transversely through the plug at its upper end portion and in communication with its opposite ends with the upper circumferential groove, longitudinal grooves formed in the plug, certain thereof extending between and connecting the upper and lower circumferential grooves and the remainder having their lower ends terminating short of the lower circumferential groove whereby the latter is cut off from communication therewith, and means for forcing lubricant under pressure through the channel into the beforementioned grooves and recess.

11. In a lubricated valve, a plug comprising a body portion provided with a stem, a circular recess formed in the upper end portion of the plug, circumferential grooves formed adjacent the upper and lower ends of the plug, a lubricant channel extending transversely through the plug at its upper end portion and in communication at its opposite ends with the upper circumferential groove, longitudinal grooves formed in the plug, certain thereof extending between and connecting the upper and lower circumferential grooves and the remainder having their lower ends terminating short of the lower circumferential groove whereby the latter is cut off from communication therewith, and having restricted connection with the upper circumferential groove, and means for forcing lubricant under pressure through the channel into the beforementioned grooves and recess.

12. In a lubricated valve, a plug comprising a body portion provided with a stem, a circular recess formed in the upper end portion of the plug, circumferential grooves formed adjacent the upper and lower ends of the plug, a lubricant channel extending transversely through the plug at its upper end portion and in communication at its opposite ends with the upper circumferential groove and at points intermediate its ends with said circular recess, longitudinal grooves formed in the plug, certain thereof extending between and connecting the upper and lower circumferential grooves and the remainder having their lower ends terminating short of the lower circumferential groove whereby the latter is cut off from communication therewith, and having restricted connection with the upper circumferential groove, and means for forcing lubricant under pressure through the channel into the beforementioned grooves and recess.

13. In a valve, the combination of a body having a head portion and a cylindrical valve seat, a cylindrical plug fitting said seat, spring means acting against the lower end of the plug for maintaining the upper end of the plug in engagement with the lower surface of the head portion, a lubricant chamber defined between overlapping portions of the head portion and the plug, a hollow stem for the plug extending through the upper end of the body and constituting a lubricant reservoir, a lubricant passage in the plug in communication with the lubricant chamber and said reservoir, valve means for controlling passage of lubricant between the reservoir and lubricant passage, lubricant grooves between the valve seat and plug receiving lubricant from the lubricant passage and adapted to discharge lubricant between the plug and cylindrical valve seat, a circumferential groove in the lower end portion of the plug for arresting the flow of lubricant in the body to prevent its passage below the plug, and a leak port in the plug for permitting discharge of fluid trapped within the plug into the valve body.

14. In a lubricated valve, a body having a longitudinal bore providing an internal plug seat, a head portion for the body, a valve plug rotatably fitting the plug seat and provided with a stem extending through the head portion in such a manner as to provide a space between said stem and head portion, a lubricant chamber defined between overlapping portions of the plug and head portion, means including a duct in the upper end portion of the plug in communication with the lubricant chamber for forcing lubricant under pressure into said chamber, longitudinally arranged lubricant grooves between the internal plug seat and the body portion of said plug, a lubricant arresting groove in the lower end portion of the plug with which said longitudinal grooves communicate and at which said longitudinal grooves terminate whereby to prevent passage of lubricant under pressure below said plug, said longitudinal grooves being adapted to receive lubricant under pressure from the beforementioned duct, and spring means normally maintaining the upper end portion of the plug in metal to metal sealing engagement with the head portion so formed and arranged as to yield in response to pressure in the lubricant chamber in excess of the spring action whereby to permit axial movement of the plug in the body and separation of the upper end portion of the plug and said head portion so that excess lubricant may escape from the lubricant chamber through the space between the stem of the plug and said head portion.

15. In a valve, a body having a transverse passageway and an internal plug seat, a head portion for the body, a plug rotatably fitting the seat and provided with a transverse bore therethrough, a lubricant chamber formed in the upper end of the plug in such a manner as to provide spaced bearing portions on the upper end of the plug, spring means retaining the bearing portions in engagement with the head portion, a groove formed circumferentially in the upper end portion of the plug, longitudinal grooves between the body and plug in communication with the circumferential groove, a lubricant arresting groove formed circumferentially in the plug adjacent to the lower portion thereof with which the longitudinal grooves communicate and at which they terminate, and means for forcing lubricant under pressure into the lubricant chamber, the upper circumferential groove and the longitudinal grooves.

16. In a lubricated valve, a body, a plug rotatable in the body, a head portion for the body, a groove formed in the upper end of the plug and covered by said head portion to provide a lubricant chamber, said groove being so arranged as to provide spaced bearing portions, spring means retaining said bearing portions in contact with the head portion, and means for forcing lubricant under pressure into the lubricant chamber to cause axial movement of the plug in the body against the action of the spring means to effect separation of the bearing portions and head portion and permit escape of lubricant from the valve.

17. In a lubricated valve, a body, a plug rotatable in the body, a head portion for the body, a groove formed in the upper end of the plug and covered by said head portion to provide a lubricant chamber, said groove being so arranged as to provide spaced bearing portions, one thereof adjacent the body, spring means retaining said bearing portions in contact with the head portion, and means for forcing lubricant under pressure into the lubricant chamber to cause axial movement of the plug in the body against the action of the spring means to effect separation of the bearing portions and head portion and permit escape of lubricant from the valve.

18. In a lubricated valve comprising a body and a plug rotatable therein and shiftable radially when in closed position under the influence of line pressure whereby fluid under line pressure passes below the plug, a head portion for the body, a groove formed in the upper end of the plug and covered by said head portion to provide a lubricant chamber, said groove being so arranged as to provide spaced bearing portions, one of which is arranged adjacent the body, spring means retaining said bearing portions in contact with the head portion and means for forcing lubricant under pressure into the lubricant chamber to cause axial movement of the plug in the body when the pressure in said chamber exceeds the combined action of the spring means and line pressure against the lower end of the plug whereby to effect separation of the bearing portions and head portion and permit escape of lubricant from the valve.

19. A valve comprising a body having a passageway therethrough and an internal plug seat, a plug rotatably fitting the seat and provided with a transverse bore adapted to register with said passageway, circumferential recesses formed in the plug adjacent the upper and lower end portions thereof and adapted to hold lubricant to effect circumferential lubricant seals between the body and plug adjacent the upper and lower portions of the latter, longitudinal grooves formed in the seating surface of the plug with the ends thereof in communication with the upper and lower circumferential recesses and so arranged relative to the plug as to provide a continuous groove receiving lubricant under pressure at all times, said grooves surrounding the passageway when the plug is in either open or closed position, a head portion for the valve body, a shoulder at the upper end portion of the plug engaging the lower surface of the head portion to seal the valve against leakage at the head portion, a lubricant chamber defined by overlapping portions of the plug and head portion, a spring retaining the shoulder in engagement with the head portion, and means including a ram for forcing lubricant under pressure into the beforementioned recesses and grooves and into the lubricant chamber, said lower circumferential recess constituting a lubricant arresting groove adapted to prevent passage of lubricant under pressure below the plug.

20. In a lubricated valve, a valve body having a head portion and an internal plug seat, a plug rotatably fitting said seat and provided with a stem projecting through the head portion a shoulder on the plug adjacent the stem in metal-to-metal engagement with the head portion, a lubricant chamber defined between overlapping portions of the head portion and plug, means for forcing lubricant to said lubricant chamber, circumferential lubricant seals receiving lubricant from the lubricant forcing means and arranged between the plug and seat adjacent the upper and lower end portions of the plug, said lower lubricant seal constituting a lubricant arresting means cooperating with the adjacent valve body part in such a manner as to prevent passage of lubricant below the valve plug, and lubricant grooves formed in the seating surface of the plug extending between the circumferential lubricant seals.

21. In a lubricated valve of the cylindrical plug type comprising a valve body and a valve plug seated therein and in which when the valve is closed and line pressure exerted against the plug the latter is eccentrically positioned within the body, said body having an open lower end, a head portion for the body, a shoulder at the upper end portion of the plug, a lubricant chamber defined by overlapping portions of the plug and head portion, a base plate closing the opening in the lower end of the body, spring means retaining the plug spaced from the base plate with the shoulder in metal to metal sealing engagement with the head portion, means for forcing lubricant under pressure between the plug and its seat and into the lubricant chamber, said plug being shiftable axially in the body when the pressure within the lubricant chamber exceeds the action of the spring to cause separation of the shoulder and head portion whereby to permit escape of excess lubricant from the lubricant chamber, and a leak port formed in the bottom of the plug and communicating with the space therebelow for permitting passage of lubricant leaking into the interior of the plug from between the plug and its seat to the space below said plug.

22. In a lubricated valve, a plug, a valve body having an internal seat for said plug and an integral head portion, a shoulder at the upper end portion of the plug engaging the head portion in metal to metal sealing relation, a lubricant chamber defined between overlapping portions of the head portion and plug, the lower end of said body having an opening therein through which the plug is insertable into the body, a base plate closing said opening, spring means interposed between the base plate and lower end portion of the plug adapted to retain the shoulder in engagement with the head portion, longitudinal lubricant grooves in the plug, an annular groove in the lower portion of the plug with which said longitudinal grooves communicate, means for forcing lubricant under pressure into the lubricant chamber, longitudinal grooves and an annular groove to lubricate the contacting surfaces of the valve plug and valve body and to effect axial movement of the plug against the action of the spring when the pressure within the lubricant chamber exceeds the action of said spring whereby to cause separation of the shoulder and head portion and to permit escape of excess lubricant from the chamber, the seat in said valve body adjacent the lower end portion of the plug being free of interruptions whereby said annular groove constitutes an arresting groove to prevent the passage of lubricant below the plug, the lower end portion of the plug having a leak port therein leading below the plug and adapted to permit drainage of lubricant from within the plug.

23. In a lubricated valve comprising a valve body and a plug therein, the latter being shiftable radially in said body under the influence of line pressure exerted thereagainst when the valve is in closed position, said body having an integral head, a shoulder formed on the plug at its upper end portion and engaging the under surface of the head in metal to metal sealing relation, a lubricant chamber defined between overlapping portions of the head and plug, the body having an opening in its lower end portion to permit insertion of the plug into the body, a base plate closing said opening, spring means supported by the base plate and acting against the plug to retain the shoulder in engagement with the head of the valve body, lubricant grooves formed in the plug and extending longitudinally thereof, an annular groove in the lower end portion of the plug with which said longitudinal grooves communicate, and means for forcing lubricant under pressure into the lubricant chamber and longitudinal grooves and annular groove to cause axial shifting of the plug in the body against the action of the spring when the pressure within the lubricant chamber exceeds said spring action so as to effect separation of the shoulder and head portion and permit escape of excess lubricant from the valve body, said annular groove constituting means for arresting flow of lubricant to prevent the latter from passing beneath the plug, and drain means formed in the plug leading therebelow to permit escape of lubricant from the interior of the plug when the valve is in closed position.

24. In a lubricated valve, a valve body having a head portion and an internal plug seat, a plug rotatably fitting said seat and provided with a stem projecting through the head portion, a shoulder on the upper end portion of the plug so arranged as to engage the head portion adjacent the stem of the plug, a lubricant chamber defined between overlapping portions of the head portion and plug, one wall thereof being constituted by the beforementioned shoulder, means for forcing lubricant to said lubricant chamber, circumferential lubricant seals receiving lubricant from the lubricant forcing means and arranged between the plug and seat adjacent the upper and lower end portions of the plug, said lower lubricant seal constituting a lubricant arresting means cooperating with the adjacent valve body part in such a manner as to prevent passage of lubricant below the plug, and lubricant grooves formed in the seating surface of the plug extending between said circumferential lubricant seals.

ROBERT CLADE.
DAVID M. KNOX.